United States Patent [19]
Adam et al.

[11] Patent Number: 5,458,545
[45] Date of Patent: Oct. 17, 1995

[54] ADAPTIVE LINE PRESSURE CONTROL FOR AN ELECTRONIC AUTOMATIC TRANSMISSION

[75] Inventors: Allen D. Adam, Brighton; Robert J. Schichtel, Holly; Howard L. Benford, Bloomfield Hills, all of Mich.

[73] Assignee: Chrysler Corporation, Highland Park, Mich.

[21] Appl. No.: 184,479

[22] Filed: Jan. 21, 1994

[51] Int. Cl.[6] .................................................. B06K 41/10
[52] U.S. Cl. ................................................ 475/120; 477/161
[58] Field of Search ........................... 475/120; 477/160, 477/161

[56] References Cited

U.S. PATENT DOCUMENTS

| | | | |
|---|---|---|---|
| 3,631,744 | 1/1972 | Blomquist | 477/145 |
| 3,680,410 | 8/1972 | Sumiyoshi et al. | 477/161 |
| 3,956,947 | 5/1976 | Leising et al. | 477/120 |
| 4,283,970 | 8/1981 | Vukovich | 477/161 |
| 4,289,048 | 9/1981 | Mikel et al. | 477/64 |
| 4,488,456 | 12/1984 | Taga et al. | 477/160 |
| 4,586,401 | 5/1986 | Nogle | 475/60 |
| 4,602,603 | 7/1986 | Honkanen et al. | 123/416 |
| 4,653,350 | 3/1987 | Downs et al. | 364/424.1 |
| 4,782,724 | 11/1988 | Furusawa et al. | 477/160 |
| 4,875,391 | 10/1989 | Leising et al. | 477/155 |
| 5,042,328 | 8/1991 | Morishige et al. | 477/161 |
| 5,109,732 | 5/1992 | Takizawa | 477/160 |
| 5,213,013 | 5/1993 | Fujiwara et al. | 477/160 |
| 5,251,509 | 10/1993 | Pollack et al. | 477/160 |
| 5,251,512 | 10/1993 | Koenig et al. | 477/161 |
| 5,289,741 | 3/1994 | Debs et al. | 477/160 |

OTHER PUBLICATIONS

McKenny, et al.; *General Motors All New Electronic Transverse FWD Automatic Transaxle*(4T80–E); Presented at International Congress and Exposition Mar. 1–5, 1993; pp. 42–43.

*Primary Examiner*—Dirk Wright
*Attorney, Agent, or Firm*—Mark P. Calcaterra

[57] ABSTRACT

The present invention provides a method and apparatus for controlling the hydraulic line pressure in an automatic transmission for a vehicle in response to the torque transmitted through the transmission such that a minimum hydraulic line pressure is provided to the frictional elements to achieve a no-slip condition through the transmission increasing transmission efficiency, thereby increasing the fuel economy of the vehicle. Hydraulic line pressure is controlled by activating a solenoid activated valve which allows fluid recirculation from the high-pressure side of the hydraulic pump to the low-pressure side of the pump. Control signals are generated based on engine speed, turbine speed, output speed (vehicle speed), hydraulic line pressures, driver selected gear, the operating gear and the torque converter operating condition for energizing the solenoid-actuated valve. The present invention further provides closed-loop adaptive control technology to learn the minimum line pressure requirements to compensate for production variability of clutch return springs, friction characteristics, surface finishes and flatness, as well as hydraulic response resulting from valve body part variation, wear, and changes over the life of the transmission.

18 Claims, 3 Drawing Sheets

ADAPTIVE LINE PRESSURE CONTROL FOR AN ELECTRONIC AUTOMATIC TRANSMISSION

BACKGROUND OF THE INVENTION

1. Field of the Invention

The present invention relates to a system for controlling the hydraulic line pressure in an electronic automatic transmission, and more particularly to a pressure regulator having a solenoid-actuated valve for adaptively controlling the hydraulic line pressure to frictional elements within the transmission based on the slip through the transmission.

2. Description of Related Art

Generally speaking, land vehicles require three basic components—a power plant such as an internal combustion engine, a powertrain and wheels. The function of the powertrain is to transmit torque generated by the power plant to the wheels thereby providing movement of the vehicle. A powertrain's main component is typically referred to as the transmission. Engine torque and speed are converted in the transmission in accordance with the tractive power demand of the vehicle to propel the vehicle. The vehicle's transmission is also capable of controlling the direction of rotation being applied to the wheels so that the vehicle may be driven both forward and backward.

An automatic transmission typically includes a hydrodynamic torque converter to smoothly transfer engine torque from the engine crankshaft to the transmission input shaft through fluid flow forces. The transmission also includes frictional elements or clutch assemblies which couple the transmission input shaft through one or more planetary gear sets to provide various ratios of torque to the transmission output shaft. The output shaft is usually connected to the drive wheels via a differential.

A hydraulic control assembly engages and disengages the frictional elements which transfer torque through the transmission and effect gear changes in the transmission. Various components, such as spring-biased spool valves, spring-biased accumulators and ball check valves, direct and regulate the fluid flow in the hydraulic control assembly. A hydraulic pump provides fluid pressure and flow rate to energize the hydraulic components in the assembly. Sufficient hydraulic line pressure is required to engage the frictional elements and prevent slippage therebetween to transmit torque from the transmission input shaft to the transmission output shaft. If insufficient line pressure is provided, the frictional elements do not fully engage and slip occurs resulting in power loss through the transmission. Conversely, if excessive line pressure is provided, the hydraulic pump torque is higher than necessary resulting in decreased fuel efficiency of the vehicle.

It is well known that a fixed displacement pump and a pressure regulator may be used to maintain the appropriate line pressure. These systems rely on springs to provide a predetermined fluid flow rate and pressure for various operating conditions. Thus, once the transmission is designed, the operating conditions of the hydraulic system is fixed. It is also well known to use a variable displacement pump in place of the fixed displacement pump and pressure regulator. These pumps are considerably more costly than fixed displacement pumps.

A thorough description of general automatic transmission design principles may be found in "Fundamentals of Automatic Transmissions and Transaxles," Chrysler Corporation Training Manual No. TM-508A. Additional descriptions of automatic transmissions may be found in co-assigned U.S. Pat. No. 3,631,744, entitled "Hydrodynamic Transmission," issued on Jan. 4, 1972 to Blomquist, et al., and U.S. Pat. No. 4,289,048, entitled "Lock Up system for Torque Converter," issued on Sep. 15, 1981 to Mikel, et al. These patents are hereby incorporated by reference.

In recent years, a more advanced form of transmission control system has been proposed, which offers the possibility of enabling the transmission to learn and adapt itself to changing conditions. In this regard, co-assigned U.S. Pat. No. 3,956,947, issued on May 18, 1976 to Leising, et al., sets forth a fundamental development in this field and is hereby incorporated by reference. Specifically, U.S. Pat. No. 3,956,947 discloses an automatic transmission design which features an adaptive control system that includes electronically operated solenoid-actuated valves for providing closed-loop control of various functions in the hydraulic control assembly.

3. Objects of the Present Invention

It is one of the principal objects of the present invention to provide a system for continually controlling the hydraulic line pressure in an automatic transmission such that the minimum line pressure necessary for full engagement of the frictional elements based on the characteristics and current operating condition of the automatic transmission improving transmission efficiency thereby increasing the fuel economy of the vehicle.

Another object of the present invention is to provide a control system for controlling hydraulic line pressure based on the torque input to the transmission.

A further object of the present invention is to provide an adaptive system for controlling the hydraulic line pressure.

It is another object of the present invention to provide a method for controlling the hydraulic line pressure in an automatic transmission such that a minimum required line pressure is provided to frictional elements to prevent them from slipping improving transmission efficiency, thereby increasing the fuel economy of the vehicle.

An additional object of the present invention is to provide a method for adaptively controlling the hydraulic line pressure, such that corrections to the methodology are incorporated based on prior operational conditions of the transmission operation.

Still another object of the invention is to provide a closed-loop control system where the control actuation can be continuously corrected as opposed to an open-loop control system in which signals to various elements are processed in accordance with a predetermined program.

SUMMARY OF THE INVENTION

To achieve the foregoing and other objects, a hydraulic control system of the automatic transmission is responsive to certain operating conditions such that the minimum hydraulic line pressure is provided to the frictional elements to maintain the torque transmitted through the transmission. The present invention provides a method and apparatus which utilizes control technology to provide a minimum hydraulic line pressure to prevent slip and compensate for variations in operating conditions. The hydraulic control system utilizes various operational parameters such as engine speed, turbine speed, output speed (vehicle speed), hydraulic line pressures, driver selected gear, the operating gear and the torque converter operating condition to generate control signals for adjusting the hydraulic line pressure applied to the frictional elements of the transmission system.

The present invention provides a method and apparatus which utilizes closed-loop adaptive control technology to learn the minimum line pressure requirements to prevent slip in a specific transmission based on prior operational conditions and to compensate for production variability of clutch return springs, friction characteristics, surface finishes and flatness, hydraulic response resulting from valve body part variation, wear, and changes over the life of the transmission. The adaptive control system performs its functions in realtime, i.e., the system takes an action which affects the output, reads the effect, and adjusts the action continuously.

BRIEF DESCRIPTION OF THE DRAWINGS

In order to appreciate the manner in which the above-recited and other advantages and objects of the invention are obtained, a more particular description of the invention will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DESCRIPTION OF THE PREFERRED EMBODIMENT

Figure 1:
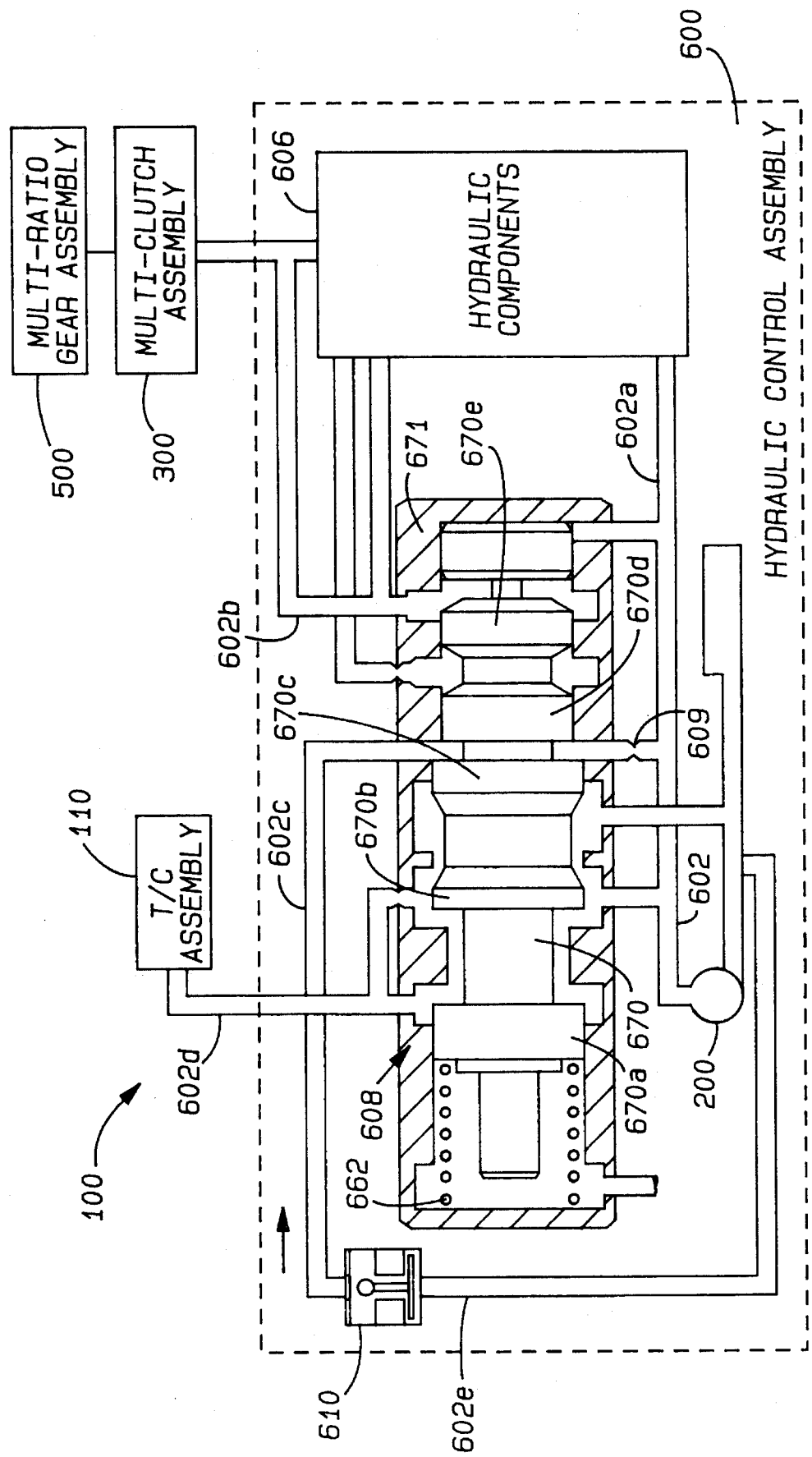
FIG. 1 is a schematic diagram of the transmission of the present invention.

An automatic transmission according to one embodiment of the present invention is adapted to be used in a vehicle such as an automobile. A schematic of the transmission 100 is shown in FIG. 1 and includes numerous subassemblies which make up the transmission, including a torque converter assembly 110, pump assembly 200, multi-clutch assembly 300 and multi-ratio gear assembly 500. While a brief description of these assemblies and sub-assemblies as they relate to the present invention is provided below, their structure and relationship are disclosed in further detail in co-assigned U.S. Pat. No. 4,875,391, entitled "An Electronically Controlled, Adaptive Automatic Transmission System" which issued on Oct. 24, 1989 to Leising, et al. (the '391 patent), and hereby is incorporated by reference. In FIG. 1, the automatic transmission 100 includes torque converter assembly 110 for variably transmitting the rotational energy from the engine to the input shaft of automatic transmission 100. The torque converter assembly 110 also includes a lock up clutch assembly to prevent slip between the rotating crankshaft of the engine and the turbine assembly of the torque converter assembly. Thus, the torque converter 110 is capable of operating in three modes: unlocked mode (UL) in which the engine crankshaft and transmission input shaft generally rotate at different speeds, full lock-up (L) where the engine crankshaft and the transmission input shaft rotate at the same speed, and EMCC mode or partial lock-up (PLU) in which the engine crankshaft and transmission input shaft rotate with controlled slight slippage. Further details of the operation of the torque converter assembly in these various modes are disclosed in the above-referenced '391 patent.

During the flow of power through the transmission 100, the multi-clutch assembly 300 provides means for application and release of various frictional elements or clutches. In other words, the multi-clutch assembly 300 is the means by which the gears of multi-ratio gear assembly 500 are selectively engaged and disengaged from the transmission input shaft, the transmission case and the transmission output shaft. These clutch assemblies are hydraulically actuated by the transmission hydraulic system 600 including various hydraulic components, parts of which are described in further detail below. A fixed positive displacement pump assembly 200 provides fluid flow to the various hydraulic assemblies, thus shifting the gear assembly and engaging the clutch assembly elements to transfer torque from the transmission input shaft to the transmission output shaft.

HYDRAULIC LINE PRESSURE CONTROL APPARATUS

Figure 2:
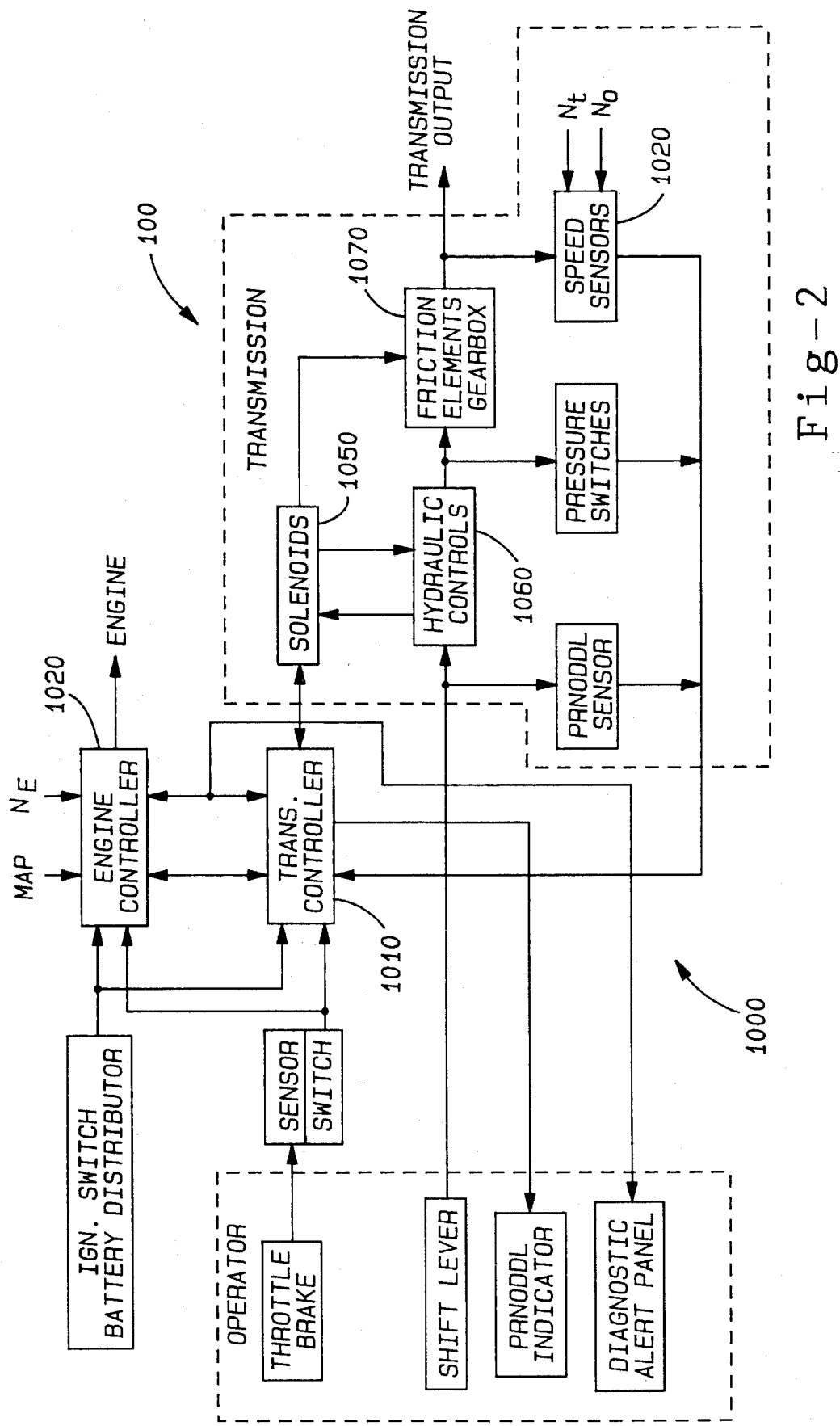
FIG. 2 is a block diagram of an electronic control system for the automatic transmission employed in the present invention.

The function of the hydraulic system 600 is to cooperate with the transmission electronic controls 1010, shown in FIG. 2, to make the transmission 100 fully automatic. Again, referring to FIG. 1, a schematic diagram of the hydraulic assembly 600 for effecting and controlling the fluid flow throughout the transmission 100 is shown. Pump assembly 200, multi-clutch assembly 300, torque converter assembly 110 and valves to be described herein are connected by a plurality of internal passageways generally indicated at 602. While the transmission of FIG. 1 and herein described does not correspond to the transmission operating in a specific gear, the present invention contemplates controlling the hydraulic line pressure during all forward gears. The specific modes of operation are detailed in the above-referenced '391 patent. Furthermore, one skilled in the art would readily understand that the present invention may be practiced during any mode of operation for the automatic transmission.

The pump assembly 200 is connected by passageways 602 to a pressure regulator valve 608. Pressure regulator valve 608 operates to control the fluid pressure and fluid flow from pump 200 to various components in the hydraulic system. Pressure regulator 608 includes valve body 671 enclosing valve element 670 which is biased by spring 662 and reciprocates in response to the fluid pressure acting on various lands, thereby regulating fluid flow from pump assembly 200 through pressure regulator 608. In operation, fluid flows from pump assembly 200 between first 670a and second 670b lands to the torque convertor assembly 110 via passageways 602d. This fluid pressure acts to engage or disengage the torque convertor lock-up clutch so that the torque convertor assembly 110 may be operated in an unlocked, partially locked or fully locked condition. This portion of the hydraulic control system 600 provides means for activating the various modes of the torque converter assembly 110 previously described.

Similarly, fluid flows through pressure regulator 608 between fourth 670d and fifth 670e lands and valve body 671 to the hydraulic components 606 including pressure actuated valves, solenoid actuated valves and accumulators and multi-clutch assembly 300 via passageways 602a and 602b. These components control the fluid flow to the various clutch elements for engaging their respective clutch assemblies. The multi-clutch assembly 300 cooperates with the multi-ratio gear assembly 500 to cause automatic transmission 100 to select and operate in an appropriate gear in response to control signals from the electronic transmission controls. The operation of the hydraulic components 606 is further detailed in above-referenced '391 patent.

Fluid also flows from pump 200 through passageway 602c and pressure regulator 608 between third 670c and fourth 670d lands to the line pressure control (LPC) solenoid-actuated valve 610. Orifice 609 is located in passageway 602c between pump 200 and pressure regulator 608. The LPC solenoid-actuated valve 610 functions to control the fluid flow recirculating from the output or high pressure side of pump 200 through passageway 602e to the input or low pressure side of pump 200.

When line pressure control is desired, LPC solenoid actuated valve 610 is opened allowing fluid recirculation to pump 200. As fluid flows through passageway 602c, orifice 609 creates a pressure differential between inlet line 602a and the volume defined by lands 670c and 670d of pressure regulator 608. This pressure drop causes valve element 670 to restrict the passageways through pressure regulator 608, thereby decreasing the hydraulic line pressure throughout the hydraulic system 600. When line pressure control is not desired, LPC solenoid actuated valve 610 is closed to prevent fluid recirculation to pump 200. Since there is no fluid flow in passageway 602c, there is not no corresponding pressure differential across orifice 609. The passageways through pressure regulator 608 remain open, thereby allowing the hydraulic line pressure to reach its maximum value.

In one embodiment of the present invention, the LPC solenoid-actuated valve 610 is designed to be normally closed. This means that in the absence of electrical power, the LPC solenoid-actuated valve 610 will prevent fluid flow in passageways 602e and thus prevent fluid recirculation from the high pressure side of pump 200 through orifice 609 to the low pressure side of pump 200. Hence, the hydraulic system will operate at maximum line pressure in the absence of electrical power.

The LPC solenoid-actuated valve 610 is actuated by electronic signals sent from transmission controller 1010. When a duty cycle is applied, the LPC solenoid-actuated valve 610 closes to allow a signal pressure to the pressure regulator 608 between lands 670c and 670d. The amount of this that LPC solenoid-actuated valve 610 is on depends on the duty cycle (DC, % ON) of the signal sent from the transmission controller 1010. DC represents the duty cycle or percent of the time that LPC solenoid-actuated valve 610 is to remain closed for a given time interval. Thus, when DC=0 the LPC solenoid-actuated valve 610 remains open and does apply a signal pressure to the regulator valve 608 thereby achieving full hydraulic line pressure in the hydraulic system 600. When DC>0, LPC solenoid-actuated valve 610 is modulated thereby allowing a proportioned signal pressure to the regulator valve 6089 thereby proportionally decreasing the hydraulic line pressure throughout the system.

Referring to FIG. 2, a block diagram of an electronic control system 1000 according to the present invention is shown. The electronic control system 1000 includes a transmission controller 1010 which is capable of both receiving signals from and transmitting signals to an engine controller 1020. While the transmission controller 1010 may be readily adapted to operate without an electronic engine controller, the transmission controller 1010 according to the present embodiment takes advantage of the fact that most automobiles today include a digital or computer-based engine controller which receives and processes signals from numerous sensors. For example, FIG. 2 shows that the engine controller 1020, and thus the transmission controller 1010, receives an input signal indicative of the engine speed ($N_e$) and the manifold absolute pressure (MAP). The engine speed is sensed by a suitable sensor such as a hall effect pick up in the distributor of the engine. This technology is described in co-assigned U.S. Pat. No. 4,602,603, entitled "Ignition Distributor—Hall Effect Sensor Switching System and Method," which issued on Jul. 29, 1986 which is hereby incorporated by reference. Transmission block 100 represents a suitable transmission structure which will operate in conjunction with the transmission controller 1010, such as a transmission described above.

One of the primary functions of the transmission controller 1010 is to generate control signals for the solenoids represented by the solenoid block 1050 which activate various solenoid-actuated valves including the LPC solenoid-actuated valve 610. In addition, the transmission controller 1010 is capable of monitoring the gear in which the transmission 100 is operating in and the lock up condition of the torque converter assembly 110.

Similarly, the hydraulic control block 1060 comprises the other valves contained in the hydraulic control system, including the pressure regulator valve 608. The frictional elements gearbox block 1070 would comprise the multi-clutch assembly 300 and the multi-ratio gear assembly 500 as described above. It should be appreciated that the electronic control system 1000 according to the present invention may be used in conjunction with other suitable transmission structures in the appropriate application.

The transmission block 100 also includes speed sensors block 1020 which is capable of providing the turbine speed of the torque convertor assembly 110 ($N_t$), which equals the speed of the input shaft ($N_i$) and output shaft ($N_o$) of the transmission 100 to the transmission controller 1010. While various methods of transmission speed sensing may be incorporated, a suitable arrangement is described in co-assigned U.S. Pat. No. 4,586,401 entitled "Transmission Speed Sensor Arrangement" which issued on May 6, 1986 and which is hereby incorporated by reference.

METHOD OF LINE PRESSURE CONTROL

Figure 3:
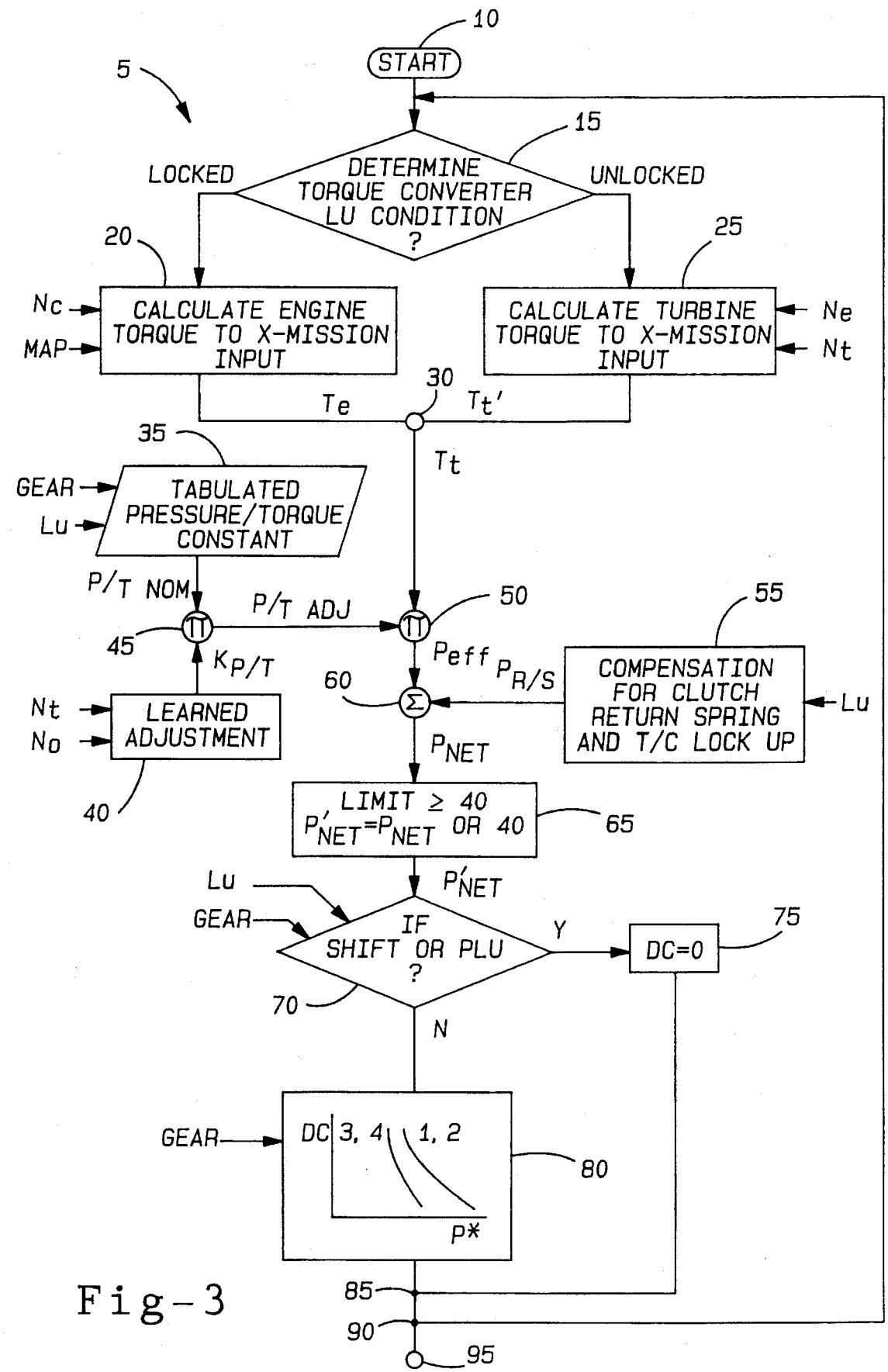
FIG. 3 is a flow chart of the method for controlling the hydraulic line pressure.

The present invention provides for adaptive control of hydraulic line pressure to the multi-clutch assembly 300 and various clutches therein during operation of all forward gears. This line pressure control is active except during shifts and EMCC operation or PLU of the torque converter when a maximum hydraulic line pressure will be maintained. Referring to FIGS. 2 and 3, the adaptive line pressure control is shown generally at 5. The methodology for line pressure control initiated at bubble 10 advances to diamond 15 where the torque converter lock up condition is determined. The transmission controller 1010 interrogates solenoid block 1050 to determine this condition. If the torque converter is in a full-locked or partial locked condition, the engine torque and transmission input torque are equal. Thus, transmission controller 1010 calculates the transmission input torque by calculating the engine torque ($T_e$) at block 20. This calculation is based on information polled from engine controller 1020 including the engine speed ($N_e$) and the manifold absolute pressure (MAP) based on the following equation:

$$T_e = T_i = f(N_e, MAP)$$

If the torque converter is in an unlocked condition, then the engine torque does not equal the transmission input torque but rather is a function of the torque converter operation. Thus, the transmission input torque is calculated at block 25 based on information polled from engine controller 1020 and transmission controller 1010 and computed as follows:

$$T_t = f(N_e, N_t)$$

While various methods may be used to compute the turbine torque, a preferred method is disclosed in the above-referenced '391 patent. An appropriate value for $T_t$ has been calculated and is now available for further processing at junction 30.

A nominal pressure/torque constant (P/T$_{nom}$) is computed at block 35 utilizing a tabular presentation of various pressure/torque constants for given gear and torque converter lock up condition. The operational gear and the torque converter lock up condition is polled from transmission controller 1010 and a table look-up routine determines the P/T$_{nom}$ for those conditions. By way of example, Table 1 represents typical nominal pressure/torque constants.

TABLE 1

| Gear | Lock-Up Condition | P/T$_{nom}$ (psi/ft-lb) |
|---|---|---|
| 1 | UL | .33 |
| 2 | UL | .35 |
| 3 | UL | .19 |
| 4 | UL | .29 |
| 3 | L or PLU | .40 |
| 4 | L or PLU | .45 |

These nominal pressure/torque constants are based on the performance characteristics of the transmission clutches which are engaged or disengaged in the multi-clutch assembly 300 and the locked or unlocked condition of the torque convertor assembly 110. P/T$_{nom}$ is then multiplied at bubble 50 by the previously determined $T_t$, resulting in an estimated effective hydraulic line pressure required to maintain engine torque through the transmission (P$_{eff}$).

An adaptive feature is incorporated at bubble 45 for adjusting the pressure torque constant based on the prior operational conditions of transmission 100. By adjusting the hydraulic line pressure and monitoring the resulting effect on the transmission, the transmission controller 1010 can learn to compensate for mechanical and hydraulic variations in the system, such as variability of clutch return springs, friction characteristics, surface finishes and flatness, hydraulic response resulting from valve body part variation, wear and changes to these conditions over the life of the transmission 100.

It is presently preferred to monitor the slip through the transmission for adaptive purposes since hydraulic line pressure controls the engagement and disengagement multi-clutch assembly 300 of automatic transmission 100. The speed difference of the turbine speed (N$_t$) and the transmission output shaft (N$_o$) will indicate when slippage is occurring within the transmission and thus, indicate insufficient hydraulic line pressure is being provided. One embodiment of the present invention contemplates continuously monitoring the rotational speed difference between the transmission input shaft and transmission output shaft ($\Delta_t$) at block 40. Once this difference exceeds a set value a learned adjustment constant (K$_{P/T}$) is generated at block 40 which would modify the pressure torque constant P/T$_{nom}$ at bubble 45 to yield an adjusted pressure torque constant (P/T$_{adj}$).

An alternate embodiment of the present invention contemplates a learned adjustment at block 40 whereby transmission controller 1010 intentionally decreases the hydraulic line pressure to achieve a slip condition. Based on this information, transmission controller 1010 would generate K$_{P/T}$ to adjust P/T$_{nom}$. A low torque, steady state condition of the automatic transmission, such as highway cruising, would provide the most suitable environment in which to conduct this method of learned adjustment.

At bubble 45 the adjusted pressure/torque constant (P/T$_{adj}$) is computed by multiplying K$_{P/T}$ and P/T$_{nom}$. At bubble 50 the effective hydraulic line pressure necessary to maintain engine torque through the transmission as compensated for by transmission variations (P$_{eff}$) can be estimated as the product of $T_t$ and P/T.

Various components of the multi-clutch assembly 300 and the torque converter 110 require additional hydraulic line pressure to overcome spring-biased valves. Accordingly, a hydraulic line pressure offset (P$_{r/s}$) for the clutch return springs of multi-clutch assembly 300 and lock up mechanism of torque converter assembly 110 is determined at block 55. This hydraulic line pressure offset may be determined from tabular data relating the lock-up condition of torque converter assembly 110 and P$_{r/s}$ based on the interrogation of the torque convertor lock-up condition. By way of example, Table 2 represents typical hydraulic line pressure offsets as determined from the spring constants for the clutch return springs and the torque converter lock-up mechanism.

TABLE 2

| LU | Pr/s (psi) |
|---|---|
| 0 | 10 |
| 1 | 0 |

While the table look up function performed in block 55 provides one means of determining the hydraulic line pressure offset, one skilled in the art would readily appreciate that other methods for determining the hydraulic line pressure offset exist. At bubble 60 P$_{r/s}$ is added to P$_{eff}$ resulting in the net hydraulic line pressure needed to maintain engine torque through the transmission (P$_{net}$).

It is presently preferred to impose a lower limit for the hydraulic line pressure, thereby providing sufficient hydraulic line pressure to operate the automatic transmission and maintain the stability of the control system. At block 65 the net hydraulic line pressure, P$_{net}$, is compared to a minimum hydraulic line pressure, P$_{min}$. If P$_{net}$ is less than P$_{min}$, the minimum value is substituted therefor otherwise P$_{net}$ is used. By way of example, a minimum effective hydraulic line pressure of 40 p.s.i. is selected at block 65. If P$_{net}$ is greater than 40 p.s.i., the estimated value of P$_{net}$ will be used. If, however, the P$_{net}$ is less than 40 p.s.i., P$_{min}$ will be substituted therefor.

Similarly, it is presently preferred to provide full hydraulic line pressure during the gear shifts and PLU of the torque convertor. At diamond 70, transmission controller 1010 determines the shift condition of transmission 100 and the lock up condition of torque converter assembly 110. If the transmission is performing a gear shift or the torque converter is in a PLU condition, the hydraulic control system 600 should provide full hydraulic line pressure. Accordingly, transmission controller 1010 signals LPC solenoid-actuated valve 610 that its duty cycle (DC, % on) should equal zero as represented by block 75. Upon this action, LPC solenoid-actuated valve 610 remains open, thereby preventing a signal pressure to the pressure regulator 608 allowing the hydraulic system 600 to achieve its maximum line pressure.

If, at diamond 70, transmission 100 is not shifting or torque converter is not in a PLU condition, then the hydraulic system 600 should operate at the net hydraulic line pressure as previously computed. At block 80, transmission controller 1010 determines the LPC solenoid-actuated valve duty cycle (DC, % on) necessary to achieve the $P_{net}$. The duty cycle, DC, is a function of the passageways 602, various components of hydraulic system 600, the performance characteristics of LPC solenoid-actuated valve 610, as well as the operation of gear transmission 100. $P_{net}$ computed above and the operational gear determined from transmission controller 1010 are used to compute the required duty cycle at block 80. One method of computing the duty cycle is to use an interpolation routine incorporating the performance curves for the LPC solenoid-actuated valve 610 and other hydraulic components. In this method, DC is computed by referencing $P_{net}$ on the x-axis of the performance curve for the gear in which the transmission is operating. From this curve, the duty cycle of LPC solenoid-actuated valve 610 to achieve $P_{net}$ can be located along the y-axis. Once DC is known, transmission controller 1010 communicates the computed duty cycle to LPC solenoid-actuated valve 610 at bubble 85. This energizes LPC solenoid-actuated valve 610 to a specified duty cycle condition and allows a proportional hydraulic pressure to signal the regulator valve 608, thus decreasing the hydraulic line pressure operating throughout hydraulic system 600 to control the hydraulic line pressure. The method of line pressure control terminates at bubble 95.

The above-described method may be repeatedly performed by returning from bubble 90 to diamond 15. Accordingly, the hydraulic line pressure required to maintain engine torque through transmission 100 may be continuously readjusted based on the operating conditions and transmission characteristics as heretofore described.

From the foregoing, those skilled in the art should realize that the present invention provides and apparatus and method for adaptively controlling hydraulic line pressure in response to the torque transmitted through the automatic transmission of a vehicle, thereby allowing the hydraulic system of the automatic transmission to operate at a minimum line pressure to increase the fuel economy of the vehicle. Although the invention has been described with particular reference to a preferred embodiment and exemplary methods for determining various system parameters, variations and modifications can be effected within the spirit and scope of the following claims.

What is claimed:

1. In a hydraulic system for an automatic transmission having pump means for causing hydraulic fluid to flow through the hydraulic system and a pressure regulator means for regulating the hydraulic line pressure in the automatic transmission, the improvement comprising line pressure control means for adjustably and selectively controlling the hydraulic line pressure in the automatic transmission, said line pressure control means being responsive to at least the rotational speed difference between an input shaft and an output shaft of the automatic transmission such that the pump means generates a minimum hydraulic line pressure necessary to maintain the torque transmitted from the input shaft of the automatic transmission to the output shaft of the automatic transmission.

2. The hydraulic system of claim 1 wherein the line pressure control means comprises:

a solenoid actuated valve interposed between a high pressure and a low pressure side of the pump means which can be energized according to a duty cycle to vary the pressure acting on the pressure regulator means;

sensing means for sensing the rotational speed difference between the input shaft and the output shaft of the automatic transmission; and actuation means for controlling the actuation of the line pressure control means by making adjustments to the duty cycle of the solenoid actuated valve according to the rotational speed difference between the input shaft and the output shaft of the automatic transmission.

3. The hydraulic system of claim 2 wherein the line pressure control means further comprises learning means for adjusting the actuation means in response to prior operational conditions of the automatic transmission.

4. The hydraulic system of claim 3 wherein the sensing means senses the rotational speed of the transmission input and output shafts and the learning means is responsive to prior speed differences between the transmission input and output shaft.

5. The hydraulic system of claim 1 wherein the line pressure control means further comprises:

a solenoid actuated valve interposed between a high pressure and a low pressure side of the pump means which can be energized according to a duty cycle;

actuation means for controlling the actuation of the line pressure control means by making adjustments to the duty cycle of the solenoid actuated valve according to the rotational speed difference of the transmission input and output shafts;

sensing means for sensing the speed of the transmission input and output shafts; and learning means for adjusting the actuation means in response to prior rotational speed differences of the transmission input and output shafts.

6. A method for controlling the hydraulic line pressure of automatic transmission fluid produced by a hydraulic pump in an automatic transmission for a vehicle having a torque convertor, a transmission input shaft, frictional elements for selectively engaging one of a plurality of gears and a transmission output shaft, the method comprising the steps of:

estimating an input torque transmitted from the torque convertor to the transmission input shaft;

selecting a pressure-torque constant related to the gear in which the transmission is operating and the hydraulic characteristics of the frictional elements;

estimating an estimated line pressure required to maintain torque through the automatic transmission based on the input torque and the pressure-torque constant;

generating a line pressure control signal in response to the effective line pressure; and adjusting the hydraulic line pressure in response to the line pressure control signal.

7. The method of controlling the hydraulic line pressure of claim 6 wherein the step of estimating the input torque transmitted from the torque convertor to the transmission input shaft further comprises determining the lock up condition of the torque convertor, estimating the input torque based on an output torque of an engine coupled to the automatic transmission if the torque convertor is in a locked condition and estimating the input torque based on an engine speed and a torque convertor speed if the torque convertor is not in a locked condition.

8. The method of controlling the hydraulic line pressure of claim 6 wherein the step of selecting a pressure-torque constant comprises tabulating data for the gear in which the transmission is operating, the lock up condition of the torque convertor and the pressure-torque constant and utilizing a table look-up routine to select the pressure-torque constant therefrom.

9. The method of controlling the hydraulic line pressure of claim 6 wherein the step of generating a line pressure control signal comprises interpolating the line pressure control signal from a performance curve of the hydraulic system for the gear in which the transmission is operating.

10. The method of controlling the hydraulic line pressure of claim 6 wherein the step of adjusting the hydraulic line pressure comprises recirculating automatic transmission fluid from a high pressure side of the hydraulic pump to a low pressure side of the hydraulic pump in response to the line pressure control signal.

11. The method of controlling the hydraulic line pressure of claim 6 wherein the method further comprises adjusting the pressure-torque constant based on prior learned operational conditions of the automatic transmission.

12. The method of controlling the hydraulic line pressure of claim 11 wherein the step of adjusting the pressure-torque constant is based on prior rotational speed difference between the transmission input shaft and the transmission output shaft.

13. The method of controlling the hydraulic line pressure of claim 12 wherein the prior rotational speed difference between the transmission input shaft and transmission output shaft are monitored to update the pressure-torque constant adjustment.

14. The method of controlling the hydraulic line pressure of claim 6 wherein the method further comprises adjusting the pressure-torque constant based on intentionally reducing the hydraulic line pressure to an unacceptable condition, as measured by the rotational speed difference of the transmission input shaft and transmission output shaft, and adjusting the pressure-torque constant in response thereto.

15. The method of controlling the hydraulic line pressure of claim 6 wherein the method further comprises adjusting the estimated line pressure required to maintain torque through the automatic transmission based on mechanical characteristics of the frictional elements and the lock up condition of the torque convertor.

16. The method of controlling the hydraulic line pressure of claim 6 wherein the method further comprises comparing the estimated line pressure with a minimum line pressure and generating the line pressure signal therefrom, wherein the line pressure signal is responsive to the estimated line pressure if the estimated line pressure exceed the minimum line pressure and the line pressure signal is responsive to the minimum line pressure if the estimated line pressure is below the minimum line pressure.

17. The method of controlling the hydraulic line pressure of claim 6 wherein the method further comprises determining the lock-up condition of the torque convertor and the shifting condition of the automatic transmission and generating the line pressure signal therefrom, wherein the line pressure signal provides for maximum hydraulic line pressure if the transmission is performing a shift or if the torque convertor is in a partial lock up condition and the line pressure signal provides for the estimated hydraulic line pressure otherwise.

18. A method for controlling the hydraulic line pressure of automatic transmission fluid produced by a hydraulic pump in an automatic transmission for a vehicle having a torque convertor capable of operating in a plurality of lock-up conditions, a transmission input shaft, frictional elements for shifting and engaging a plurality of gears and a transmission output shaft, said method comprising the steps of:

estimating the torque transmitted to the transmission input shaft from the torque convertor based on the lock-up condition of the torque convertor;

selecting a pressure-torque constant related to the plurality of gears in which the transmission is operating and the hydraulic characteristics of the frictional elements;

adjusting the pressure-torque constant based on prior rotational speed differences between the transmission input shaft and the transmission output shaft;

estimating an estimated line pressure required to maintain torque through the automatic transmission based on the torque transmitted to the transmission input shaft and the pressure-torque constant;

adjusting the estimated line pressure required to maintain torque through the automatic transmission based on mechanical characteristics of the frictional elements and the torque convertor;

comparing the estimated line pressure to a minimum line pressure and generating a line pressure signal therefrom, wherein the line pressure signal is responsive to the estimated line pressure if the estimated line pressure exceed the minimum line pressure and the line pressure signal is responsive to the minimum line pressure if the estimated line pressure is below the minimum line pressure;

determining the lock-up condition of the torque convertor and the shifting condition of the automatic transmission; and adjusting the hydraulic line pressure in response to the line pressure control signal, the lock-up condition of the torque convertor and the shift condition of the automatic transmission.

* * * * *